(12) United States Patent
Nakayasu

(10) Patent No.: US 7,198,249 B2
(45) Date of Patent: Apr. 3, 2007

(54) ELECTROMAGNETIC SHUTTLE VALVE

(75) Inventor: Yuji Nakayasu, Troy, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 100 days.

(21) Appl. No.: 11/159,041

(22) Filed: Jun. 22, 2005

(65) Prior Publication Data

US 2006/0289815 A1 Dec. 28, 2006

(51) Int. Cl.
*F16K 31/12* (2006.01)

(52) U.S. Cl. ........................ 251/30.04; 251/38
(58) Field of Classification Search .......... 251/30.01, 251/30.02, 30.03, 30.04, 38, 129.15; 303/119.2
See application file for complete search history.

(56) References Cited

U.S. PATENT DOCUMENTS

| | | | | |
|---|---|---|---|---|
| 2,251,441 A | * | 8/1941 | Dillman | 137/316 |
| 3,103,337 A | * | 9/1963 | Forte | 251/30.03 |
| 5,564,673 A | * | 10/1996 | Pieren | 251/30.03 |
| 5,735,582 A | * | 4/1998 | Eith et al. | 303/119.2 |
| 5,810,330 A | * | 9/1998 | Eith et al. | 251/129.19 |
| 5,865,213 A | * | 2/1999 | Scheffel et al. | 137/614.16 |
| 6,755,390 B2 | * | 6/2004 | Masuda et al. | 251/30.03 |

FOREIGN PATENT DOCUMENTS

DE 10252231 A1 11/2003

* cited by examiner

*Primary Examiner*—Eric Keasel
*Assistant Examiner*—John K. Fristoe, Jr.

(57) ABSTRACT

An electromagnetic shuttle valve with two valve passages (5, 6) provides an increased cross-section of the second valve passage (6) by increasing the diameter of the second valve closure member (8). To this end, a compression spring (17) which biases the second valve closure member towards the first valve closure member (7) is arranged inside the second valve closure member (8) and the second valve seat (27). It abuts a radial projection formed on the housing sleeve (1) below the second valve seat (27). In order to provide an even larger cross-section of the second valve passage (6), the housing sleeve diameter can increase around the second valve seat (27). In this case, the housing sleeve can include a bulged collar 9 to provide a stop for axial movement during assembly.

7 Claims, 2 Drawing Sheets

ELECTROMAGNETIC SHUTTLE VALVE

BACKGROUND OF THE INVENTION

The present invention relates to an electromagnetic shuttle valve as it is commonly used in electro-hydraulic brake systems that are equipped with traction control or electronic stability control functions. This valve is located between the suction side of a self-priming hydraulic pump and the brake line which through a non-actuated master cylinder is connected to the brake fluid reservoir. The shuttle valve has the purpose to connect the suction side of the pump to the brake line if brake fluid needs to be supplied to the pump from the reservoir. Otherwise, it remains in its normally closed position.

A shuttle valve of this kind is for instance known from the German published patent application DE 10252231 A1. The valve includes a first and second valve passage controlled by a first and second valve closure member, with the second valve closure member is integrated into the same part that carries the first valve piece. In this coaxial arrangement, the second valve passage can only be opened when the first valve passage is open. The first valve passage is formed by an orifice, while the second valve passage ideally has a large fluid flow cross-section. The first valve closure member is biased toward the first valve seat by a compression spring and is removed from the first valve seat by means of the excitation of an electromagnetic coil. The second valve closure member, which is manufactured in one piece with the first valve seat, is biased toward the first valve closure member by means of the compression spring and can only move away from the second valve seat if the first valve closure member has been removed from the first valve seat. The compression spring acting on the second valve closure member is arranged around the circumference of the second valve closure member. This limits the available diameter of the second valve closure member and thus of the second valve passage. However, in cold temperatures when the brake fluid is highly viscous, a larger diameter for the second valve passage is desirable.

It is therefore the objective of the current invention to suggest a valve design that allows for a larger cross-section of the second valve passage.

It is another objective of the current invention to keep the cost of the valve low without complicating manufacturing.

SUMMARY OF THE INVENTION

This objective is obtained by a shuttle valve whose second valve closure member comprises a stepped axial bore and wherein the compression spring acting on this second valve closure member extends into the stepped bore where it's one end abuts a step in the bore. This arrangement allows to extend the diameter of the second valve closure member since the compression spring does not need to be arranged around the outside of the second valve closure member but extends into the inner bore.

Since the diameter of the compression spring is reduced, it can extend through the second valve seat and be supported by a tab or a rim of the housing itself. By this means, an additional spring support member can be eliminated.

A particularly simple construction is obtained if the housing is a deep drawn sleeve where the second valve seat is press-fitted into the sleeve, wherein the end of the spring remote from the second valve closure member abuts at least one portion of the housing sleeve, which is shaped as a radially inward projection at the remote end of the second valve seat member.

This projection may either be a rim or a number of tabs crimped into that end of the housing sleeve.

A further increase of the fluid flow cross-section of the second valve passage can be achieved if the housing sleeve increases in diameter around the second valve seat.

Further details and advantages can be gathered from the following description of two rawings.

BRIEF DESCRIPTION OF THE DRAWINGS

In the figures.

DETAILED DESCRIPTION OF THE DRAWINGS

Figure 1:
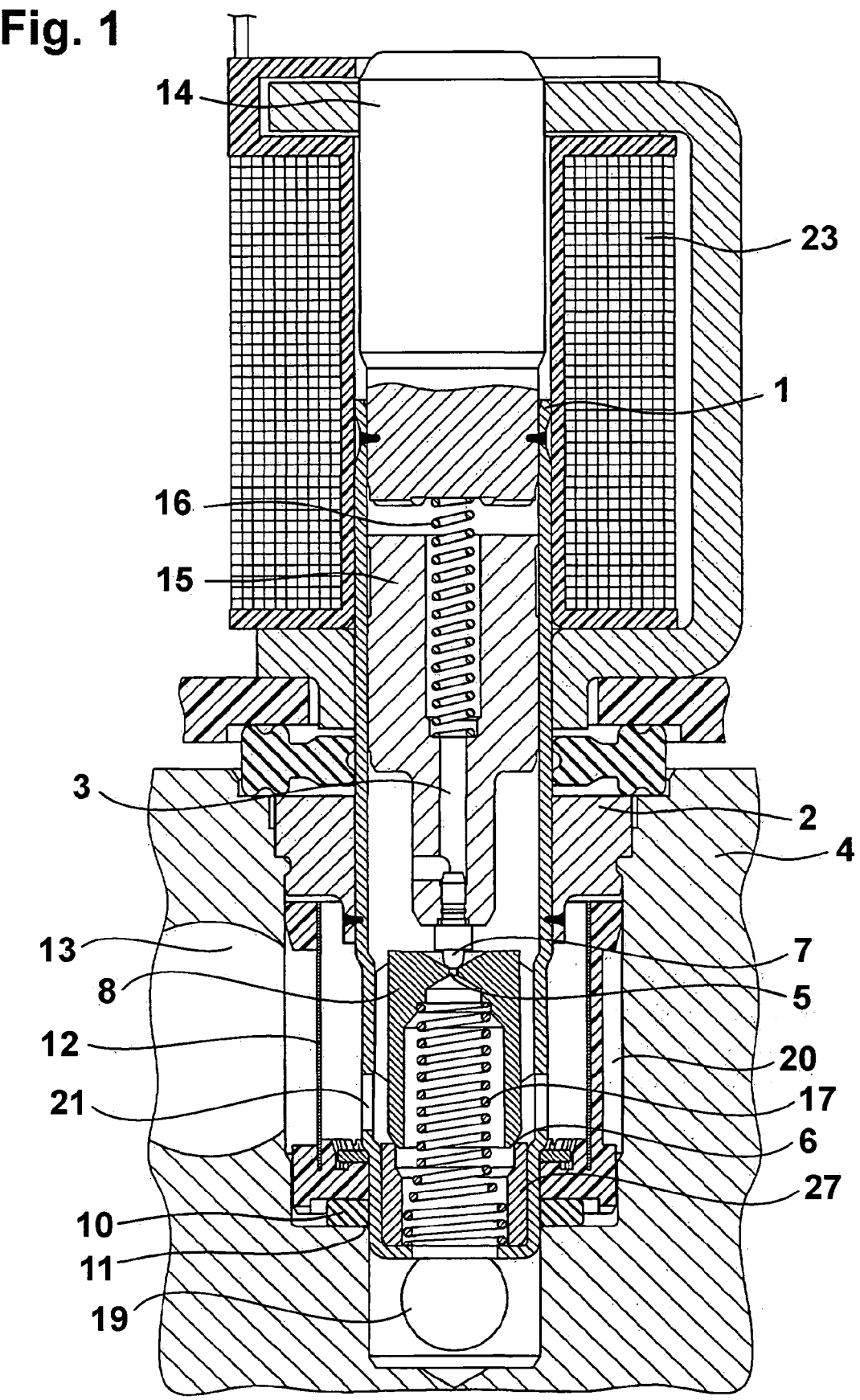
FIG. 1 shows a first embodiment of the electromagnetic shuttle valve that only requires a few changes to the current design.

FIG. 1 shows a considerably enlarged longitudinal cross-sectional view of an electro-magnetic shuttle valve including a one-part deep-drawn housing sleeve 1 of a thin-walled design that accommodates a separate retaining collar 2 seated on the outside periphery of the housing sleeve and attached by means of laser welding. The retaining collar is made by non-cutting shaping, for instance as a cold-heading part. On its outside periphery, the retaining collar is shaped as a caulking punch so that it is press-fitted in a stepped bore of a block-shaped valve carrier 4 with its undercut extending around the periphery of the pre-assembled housing sleeve 1. The soft material of the valve carrier 4 is displaced during the pressing operation into the undercut for fastening and sealing purposes. Above the retaining collar 2, the open-ended portion of the housing sleeve 1 is closed by means of a plug 14 additionally assuming the function of a magnetic core. The plug 14 is also attached to the housing sleeve 1 by means of laser welding. Plug 14 is a low-cost cold-heading part as well. A magnet armature 15 is arranged below the plug 14 and is equally manufactured in a very inexpensive way from a round or many-sided profile by means of cold-heading or extruding. A first compression spring 16 is arranged between the plug 14 and the magnet armature 15, biasing the armature 15 away from the plug 14. At its end remote from the plug 14, the magnet armature carries a first valve closure member 7. For pressure compensation, the magnet armature 15 comprises the bore 3, which allows the pressure at the valve inlet 13 to prevail between armature 15 and plug 14 as well.

The first valve closure member 7 is press-fitted into the armature 15 by means of self-caulking. This cooperates with the first valve passage in the form of an orifice 5. This orifice 5 is arranged in a second valve closure member 8. The second valve closure member 8 is substantially designed at a tubular, solid-turned or cold-heading part with its inner bore narrowing to the orifice 5 at the first valve passage and providing the seat for the first valve member 7. The second valve closure member 8 is acted upon in the valve's closed position of the first valve closure member 7 by a second compression spring 17, biasing it toward the first valve closure member 7. The second valve closure member 8 is designed with axially extending radial ribs or recesses, respectively, to allow smooth axial movement while at the same time providing an axial fluid passage along its perimeter for pressure compensation.

Due to the effect of the first compressing spring 16 interposed between the plug 14 and the magnet armature 15, the bottom of the second valve closure member 8 remains in the valve's basic position shown in the drawings on a second valve passage 6 provided in the bottom end of the valve's housing sleeve 1. The valve seat for the second valve passage 6 is arranged on a valve seat member 27. The second valve closure member 8 and the valve seat member 27 are configured at solid-turned parts or cold-heading parts. The second valve closure member 8 is a slim piston part that is conically turned at its bottom end and inexpensively manufactured from free-cutting steel. The conical end normally bears against the conical sealing seat of the hollow cylindrical valve seat member 27 which, when required, just like the valve closure member 8, can be furnished with a surface hardening in the area of the sealing surfaces. The second valve seat member 27 is designed as a tube-shaped part, so that the second compression spring 17 extends through its center and abuts an inwardly bent rim on the housing sleeve 1. The second valve seat member 27 is press-fitted into the housing sleeve 1.

To accommodate and seal the valve housing sleeve 1 in the bore step 11 of the valve carrier 4, the valve housing 1 is decreased in diameter in the area of the bore step 11 and equipped with a sealing ring 10 so that between the housing sleeve 1 and the bore step 11 leakage flow is prevented between the pressure fluid inlet 13 opening horizontally into the valve sleeve 1 and the pressure fluid outlet 19 arranged below the valve housing sleeve 1. The pressure fluid inlet 13, which is illustrated as a transverse channel in the valve carrier 4, is continued through the angular filter 12 disposed in the hollow space 20 of the valve carrier 4 to the punched transverse holes 21 in the housing sleeve 1 so that pressure fluid on the inlet side is applied directly to the second valve closure member 8 and, by way of the axial fluid passages along its perimeter, directly to the valve closure member 7 and the first valve seat.

This version of an electromagnetic shuttle valve increases the possible cross-section of the second valve passage significantly by way of arranging the second compression spring 17 inside the second valve closure member 8 on one side and inside the second valve seat 27 on the other side. This allows for an increase in diameter of the second valve closure member and the second valve seat respectively.

Figure 2:
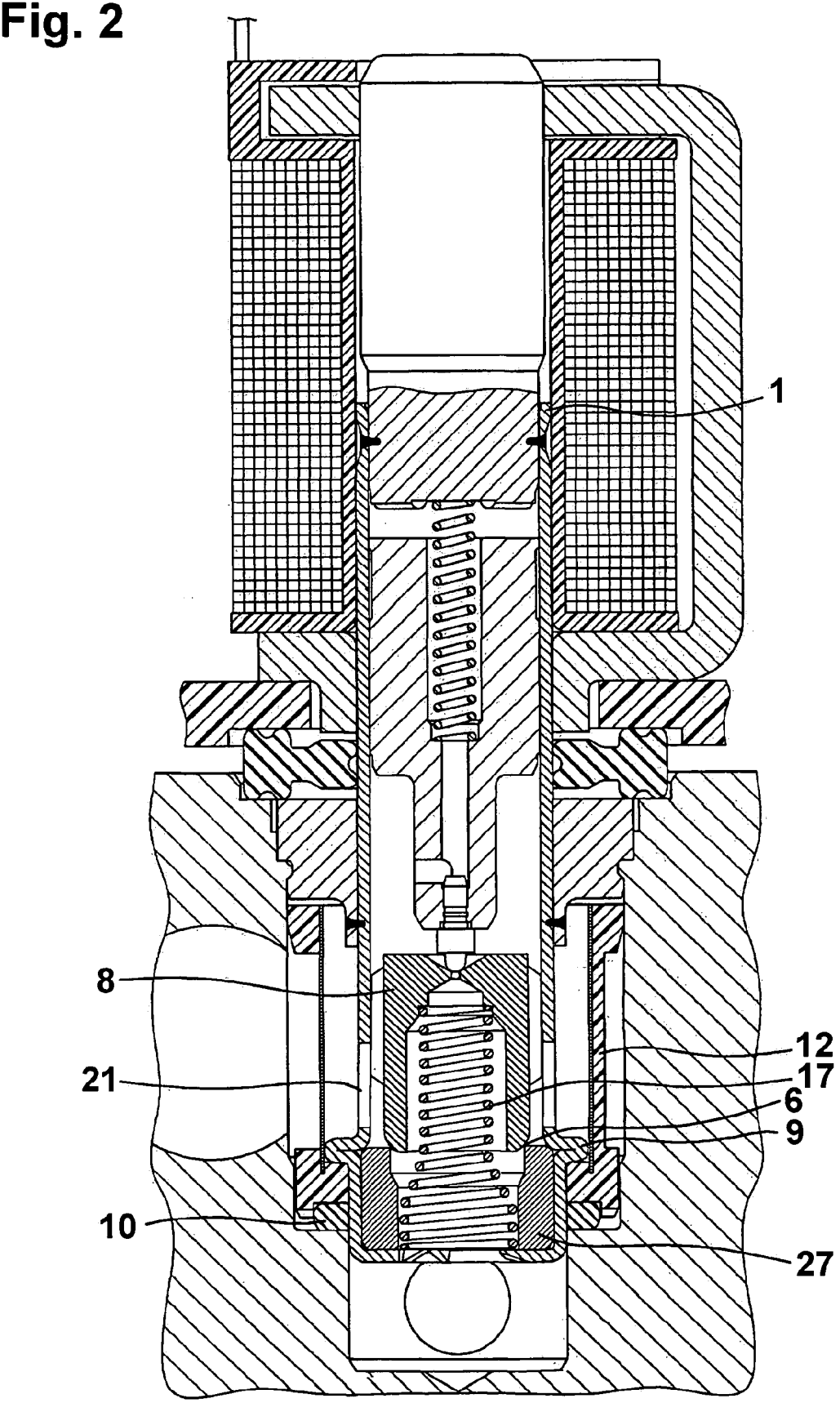
FIG. 2 shows a second embodiment of the electromagnetic shuttle valve with a further increased cross-section of the second valve passage, further improving fluid flow.

An even larger increase of the cross-section of the second valve passage is possible with a construction according to FIG. 2.

The parts in FIG. 2 that are different from FIG. 1 are the housing sleeve 1, the second valve closure member 8, and the valve seat member 27. Minor changes were made to the second compression spring 17 and the angular filter 12 including the sealing ring 10.

In this embodiment, the housing sleeve 1 doesn't decrease in diameter toward the bottom of the picture, but it increases its diameter near the second valve passage 6. In order to provide a stop for the insertion into the angular filter 12, the housing sleeve 1 comprises a bulged radial collar 9 arranged near the upper edge of the valve seat member 27. The radial holes 21 are enlarged compared to FIG. 1. Due to the increased diameter of the housing sleeve 1, the valve passage 6 can be designed wider in diameter than in FIG. 1. This construction requires a change in the valve carrier 4; however, it provides a better fluid flow compared to the known arrangement or the arrangement according to FIG. 1.

In the shown embodiment, the second compressing spring 17 is not supported by a continuous annual rim on the bottom of housing sleeve 1. The present embodiment only provides a plurality of inward tabs that were crimped into the housing sleeve 1.

Depending on the available equipment and manufacturing requirements, the embodiment according to FIG. 1 maybe easier to realize with existing equipment, while the embodiment of FIG. 2 provides an even larger cross-section of the second valve passage 6.

What is claimed is:

1. An electromagnetic valve including a first and second valve closure member (7, 8) arranged in a housing sleeve (1), and designed in a coaxial arrangement in the housing sleeve (1), to open and close a first and second valve passage (5,6), including a pressure fluid inlet (13) and a pressure fluid outlet (19) opening into the housing sleeve (1), with the first valve closure member (7) designed to open and close the first valve passage (5) arranged in the second valve closure member (8) and responds to the electromagnetic excitation of a valve coil and with the second valve closure member (8) designed to open the second valve passage (6) under the influence of a compression spring (17) exclusively when the first valve passage (5) is opened so that, if pressure fluid prevails in the pressure fluid inlet (13), it is able to propagate to the pressure outlet (19) along a flow path inside the housing sleeve (1), in which the first and the second valve passage (5,6) are positioned, in line wherein the second valve closure member (8) comprises a stepped axial bore and wherein the compression spring (17) extends into the stepped bore where its one end abuts the step in the bore and thus biases the second valve closure member (8) toward the first valve closure member (7).

2. The valve according to claim 1, wherein the second valve seat is substantially tubular and the compressing spring (17) extends into the tube.

3. The valve according to claim 2, wherein the housing is a deep-drawn sleeve (1) and the second valve seat (27) is press-fitted into the housing sleeve (1), and wherein the end of the compressing spring (17) remote from the second valve closure member (8) abuts at least one portion of the housing sleeve (1), which is shaped as a radially inward projection at the remote end of the second valve seat member (27).

4. The valve according to claim 3, wherein the inward projection of the housing sleeve (1) is an angular rim.

5. The valve according to claim 3, wherein at least one projection of the housing sleeve consists of at least one inward tab produced by crimping.

6. The valve according to claim 1, wherein the housing is a deep-drawn sleeve, whose diameter around the second valve seat member (27), is wider than around the second valve closure member (8).

7. The valve according to claim 6, wherein the housing sleeve (1) comprises a bulged radial collar (9) providing a stop for axial movement during assembly in a hydraulic system.

* * * * *